(12) United States Patent
Kiselis et al.

(10) Patent No.: US 8,480,103 B2
(45) Date of Patent: Jul. 9, 2013

(54) TWIST BEAM SUSPENSION WITH Y-BEAM CONTROL ARM

(75) Inventors: Gregory Paul Kiselis, Oak Ridge, NC (US); Michael Alwyn Brown, Summerfield, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 13/504,324

(22) PCT Filed: Oct. 30, 2009

(86) PCT No.: PCT/US2009/062726
§ 371 (c)(1),
(2), (4) Date: Apr. 26, 2012

(87) PCT Pub. No.: WO2011/053308
PCT Pub. Date: May 5, 2011

(65) Prior Publication Data
US 2012/0217714 A1    Aug. 30, 2012

(51) Int. Cl.
*B60G 9/02* (2006.01)
*B60G 7/00* (2006.01)

(52) U.S. Cl.
USPC ............................... 280/124.11; 280/124.116

(58) Field of Classification Search
CPC ...... B60G 7/001; B60G 9/003; B60G 2200/30; B60G 2200/31; B60G 2204/148; B60G 2204/41; B60G 2204/4104; B60G 2204/41043; B60G 2204/4306; B60G 2204/43065
USPC ....... 280/124.11, 124.116, 124.128, 124.133, 280/124.153
See application file for complete search history.

(56) References Cited

U.S. PATENT DOCUMENTS

| | | | |
|---|---|---|---|
| 4,310,171 A | 1/1982 | Merkle | |
| 4,497,504 A * | 2/1985 | Duff | 280/86.751 |
| 4,690,426 A * | 9/1987 | Kubo et al. | 280/124.131 |
| 5,366,237 A | 11/1994 | Dilling et al. | |
| 6,854,750 B2 | 2/2005 | Carlstedt et al. | |
| 6,883,813 B2 | 4/2005 | Gottschalk | |
| 7,077,413 B2 | 7/2006 | Svartz et al. | |
| 7,270,341 B2 * | 9/2007 | Longworth et al. | 280/124.11 |
| 8,322,736 B2 * | 12/2012 | Bowers | 280/124.116 |
| 2012/0200055 A1 * | 8/2012 | Alexander et al. | 280/124.11 |

* cited by examiner

*Primary Examiner* — Joseph Rocca
(74) *Attorney, Agent, or Firm* — Martin Farrell; Michael Pruden

(57) ABSTRACT

A suspension arrangement for interconnecting a frame and an axle in a vehicle includes a control arm having a first beam and a second beam in parallel, spaced relation, each beam having a first end with a single arm and a second end with an upper arm and a lower arm to define a Y-shape, the first end being pivotally connectable to a vehicle frame, and the second end being connectable to a vehicle axle disposed between the upper and lower arms, and a bushing arrangement mountable to the vehicle axle, the bushing arrangement having an upper portion connecting between the upper arms of the first beam and second beam and a lower portion connecting between the lower arms of the first beam and second beam.

18 Claims, 4 Drawing Sheets

TWIST BEAM SUSPENSION WITH Y-BEAM CONTROL ARM

FIELD OF THE INVENTION

The invention is directed to vehicle suspensions, in particular heavy vehicle suspensions. More particularly, the invention is directed to a rear suspension arrangement for interconnecting a frame and axle in a vehicle.

BACKGROUND AND SUMMARY

Many rear air suspensions allow twist in the axle during roll events (opposite wheel travel in the vertical direction) to provide roll stiffness. However, because of the manner in which the axle is attached to such suspensions, unwanted forces are transferred to the axle.

One approach to a solution is shown in U.S. Pat. No. 4,310,171 to Merkle. Merkle shows a vehicle axle attachment having a control arm having two parallel plates shaped to form horizontally spaced lugs at one to attach to the vehicle hangar bracket and vertically spaced lugs at the opposite end to attach to the axle. The vertically spaced lugs are rigidly connected to the axle by way of a flange. With a rigid connection, the roll rate of this arrangement is fixed.

A suspension arrangement in accordance with the invention includes a control arm provided as a beam having a first end with a single arm and a second end with an upper arm and a lower arm diverging to define a Y-shape, the first end being connectable to a vehicle frame, and the second end being connectable to a vehicle axle disposed between the upper and lower arms. A bushing arrangement mounts the arms to the vehicle axle, the bushing arrangement having an upper portion connecting to the upper arm and a lower portion connecting to the lower arm, the bushing having a selected rate.

The suspension according to the invention improves the transfer of twisting forces to the axle by constraining the axle between two arms of the control arm. The axle is twisted about the center of torsion, allowing increased twist to the axle without the introduction of an extra bending moment in the axle. The invention advantageously adds adjustment of the response of the suspension by way of the axle bushings.

According to another aspect of the invention, the control arm is formed of a first beam and a second beam in parallel, spaced relation, the first beam and second beam being interconnected to the axle by the bushing arrangement. The spacing may be varied, according to the invention, to provide the desired mechanical advantage for twisting the axle. The first beam and second beam are relatively thin plate members that provide a weight advantage in the assembly while providing sufficient strength and stiffness in the vertical direction. In addition, forming the first beam and second beam as thin plates provides some lateral flexibility to the suspension assembly for accommodating lateral suspension events.

The invention thus provides an improvement in roll rate by a control arm that is much stiffer in the vertical direction than in the lateral direction.

According to the invention, the first beam and second beam are interconnected only by the axle bushing arrangement and a second bushing arrangement mounting the beams to the vehicle frame.

According to another aspect of the invention, the first beam and second beam are connected to form the control arm with the axle end bushing arrangement disposed between the respective upper arms and lower arms.

Preferably, the bushing arrangement includes two upper bushings and two lower bushings.

According to another aspect of the invention, the rate of the bushings that attach the beam to the axle may be varied to influence certain suspension characteristics. For example, making the two top bushings stiffer in the fore/aft direction and relatively softer in the vertical direction and making the bottom bushings softer in the fore aft direction and relatively stiffer in the vertical direction can improve roll steer, lateral stiffness, roll rate, toe stiffness and camber stiffness.

According to yet another aspect of the invention, the first beam and second beam each include a plate section and flanges extending perpendicularly from edges of the plate section, wherein the first beam and second beam are mutually disposed with the respective flanges extending in opposite directions.

According to another aspect of the invention, the suspension arrangement further includes a hanger mountable to the frame, the first end of the control arm being pivotally mounted to the hanger.

According to yet another aspect of the invention, the suspension arrangement further includes a spring mountable between the axle and the frame. The spring may be disposed between a seat on an arm mountable to and extending from the axle and a bracket mountable to the frame.

BRIEF DESCRIPTION OF THE DRAWINGS

The invention will be better understood by reference to the following detailed description read in conjunction with the appended drawings, in which.

DETAILED DESCRIPTION

Figure 1:
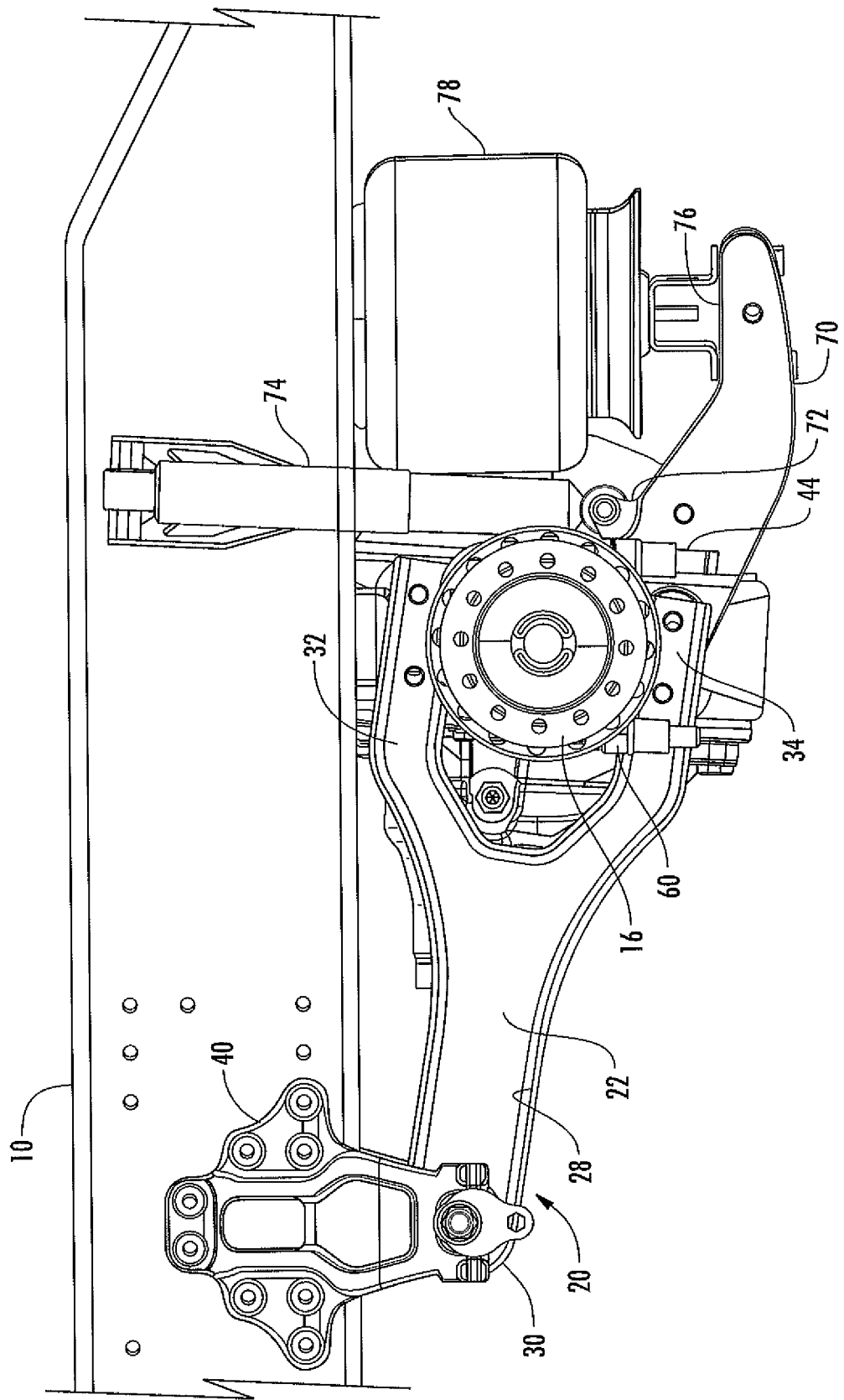
FIG. 1 is a side view of a suspension arrangement in accord with the invention.
Figure 2:
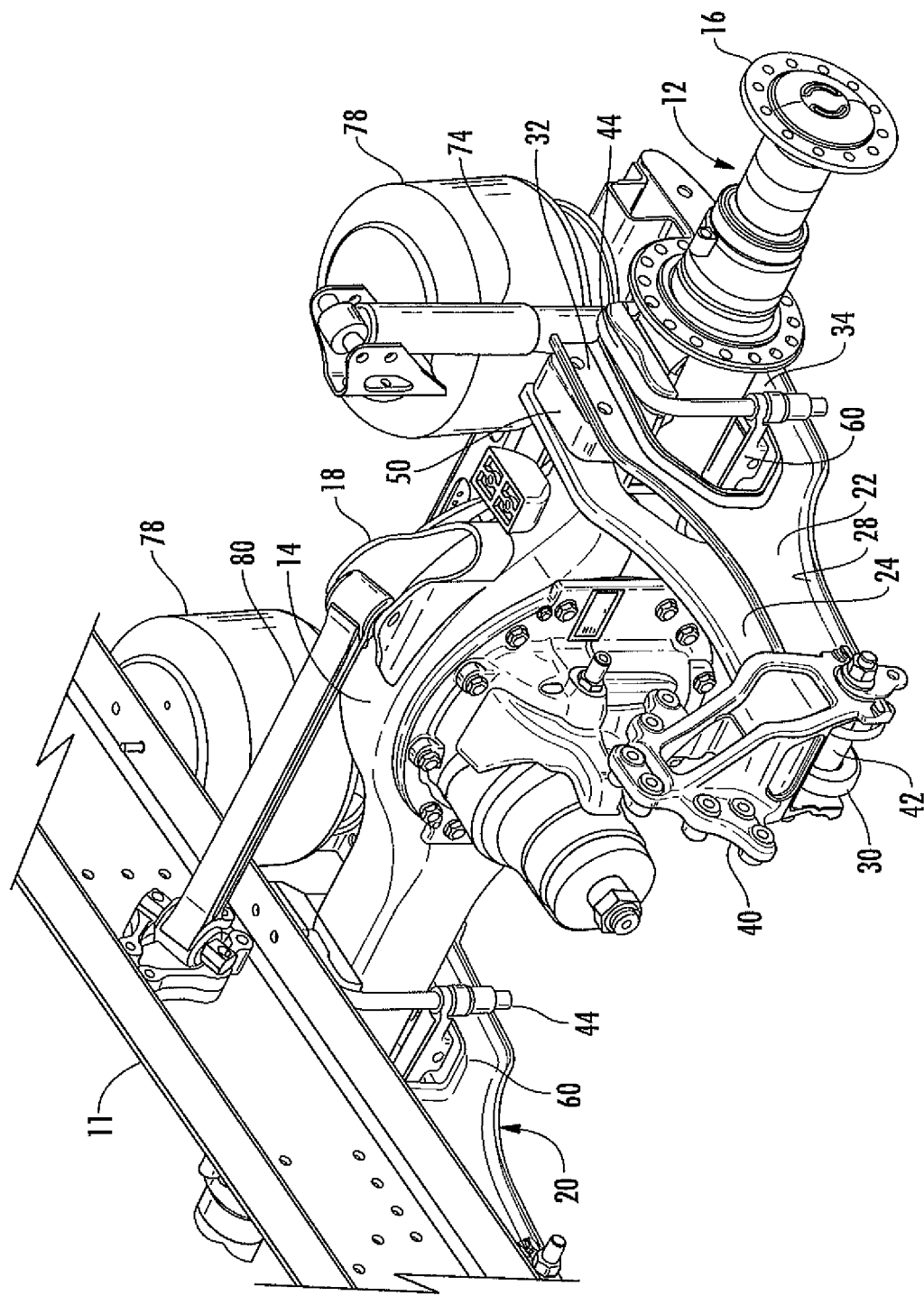
FIG. 2 is a perspective view of the suspension arrangement of FIG. 1.

FIG. 1 is a side view of a suspension arrangement in accordance with the invention. FIG. 2 shows a perspective view of the suspension arrangement of FIG. 1. The suspension arrangement connects a vehicle frame rail 10 and vehicle axle 12. In FIG. 2, a vehicle frame rail 11 of the opposite side of the frame is shown, while the frame rail in the foreground of the drawing has been removed for clarity. An assembly of the suspension arrangement of the invention would be mounted on each end of the axle to connect each end of the axle to the respective frame rail. FIG. 2 illustrates in detail one such assembly; only parts of the opposite side are shown to avoid over-complicating the figure.

The suspension interconnects a vehicle axle 12 to the vehicle frame 10. The axle 12 in the illustration is a driven axle and includes a gear housing 14 which connects to an output shaft of a transmission (not illustrated). The axle 12 also includes a spindle 16 for mounting a wheel or wheels to the axle. The gear arrangement in the gear housing 14 transmits driving force to the spindle to turn the wheels.

The suspension includes a control arm 20 extending between the vehicle frame 10 and the axle 12. In the figures, the control arm 20 is formed by two, parallel beams 22, 24. The embodiment of two parallel beams 22, 24 is preferred because it provides relatively light weight control arm with sufficient strength and vertical stiffness and provides a redundancy in the event one beam is disabled. The invention, however, contemplates a single beam forming the control arm 20, and the following description should be understood in that context. The beams 22, 24, are each shaped in a Y configuration, having a first end 30 with a single arm and a second end with two diverging arms, an upper arm 32 and a lower arm 34. The terms "upper" and "lower" are relative to the orientation of the beams 22, 24 when mounted on a vehicle frame, as portrayed in the figures. Each beam 22, 24 is a substantially planar sheet or plate member and the outer edges 28 are bent or formed perpendicularly to form flanges for stiffening the beam. If weight is not an important consideration, the beam may be formed as a plate member of sufficient thickness to provide needed stiffness. Alternatively, the beam may be formed as a box member, having side walls and a perimeter wall enclosing a space.

The spacing between beam 22 and beam 24 forming the control arm 20 may be selected to provide a desired mechanical advantage in transferring force to the axle 12. In addition, the depth of the outer edges 28 of the beams 22, 24 may be selected to provide a desired amount of lateral stiffness in the beams.

The first end 30 of the control arm 20 is mounted for vertical pivoting movement to a hanger bracket 40 that is attached to the vehicle frame. A hangar bushing arrangement 42 may be used.

According to the invention, the axle 12 is mounted to the control arm 20 between the divergent upper arm 32 and lower arm 34. An upper bushing assembly 50, shown in the perspective view in FIG. 3, connects the upper arms 32 of the control arm 20 to the axle 12.

Figure 4:
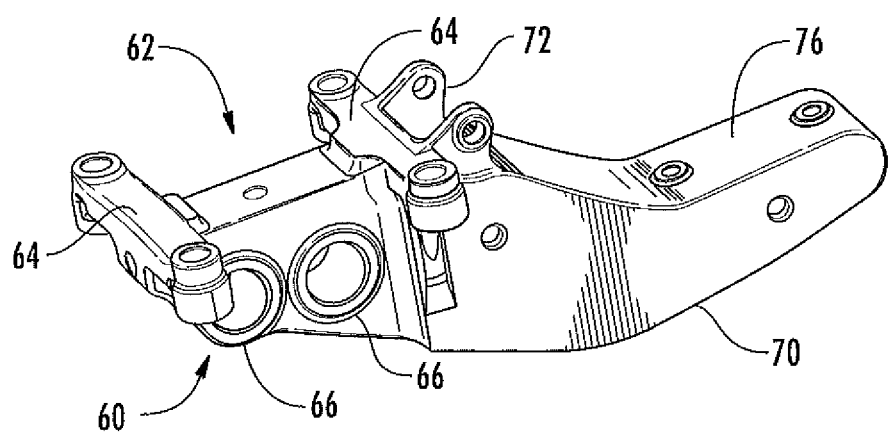
FIG. 4 is a perspective view of one embodiment of a bottom bushing device and spring arm for connecting a control arm to the axle and supporting a spring.

A lower bushing assembly 60, shown in perspective view in FIG. 4, connects the lower arms 34 of the control arm 20 to the axle 12. The upper bushing assembly 50 and lower bushing assembly 60 are connected to the axle and clamp the axle between them by U-bolts 44 (only one is visible in FIG. 2).

Figure 3:
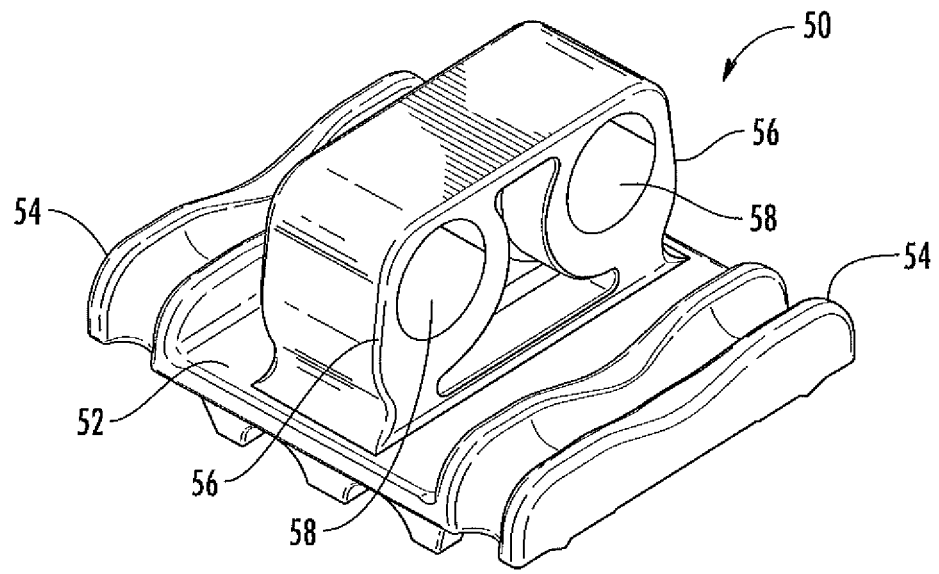
FIG. 3 is a perspective view of an embodiment of a top bushing device for connecting control arms to an axle.

The upper bushing assembly 50, referring to FIG. 3, includes a plate 52 that engages the axle 12, and has two shoulder and trough formations 54 formed in the plate to engage the U-bolt 44 for securing the upper bushing to the axle. Two bushing mounts 56 are formed in parallel and upstanding on the plate 52. The bushing mounts 56 have holes 58 that are substantially parallel to the axle. The bushing mounts 56 carry a selected bushing (not illustrated) in the respective holes 58. The upper arms 32 of the control arm 20 are mounted to the upper bushing assembly 50 by way of fasteners inserted through the bushings in the bushing mounts 56.

In the illustrated embodiment, the beams 22, 24 are interconnected at the first end 30 of the control arm 20 and at the diverging upper arm 32 and lower arm 34, but not therebetween. This provides a degree of lateral flexibility, as discussed below.

Turning to FIG. 4, the lower bushing assembly 60 includes a seat 62 to engage the bottom of the axle 12. The seat 62 is between bars 64 having mounting holes which accept the U-bolt 44 for securing the lower bushing assembly 60 to the axle 12 as described above. The lower bushing assembly 60 also includes two bushing mounts 66 disposed below the seat 62. The bushing mounts 66 are formed with holes parallel to the axle, as in the upper bushing assembly 50, and carry a selected bushing (not shown). The lower arms 34 of the control arm 20 are mounted to the lower bushing assembly 60 by way of fasteners inserted through the bushings in the bushing mounts 66.

Figure 5:
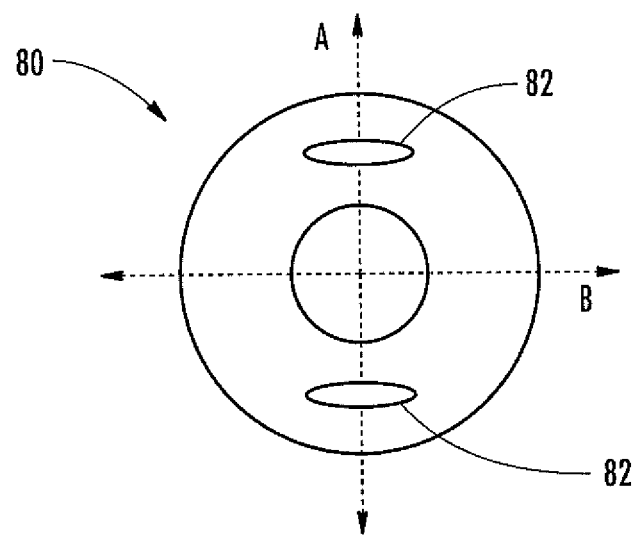
FIG. 5 is an example of a tuned bushing which may be used in the suspension arrangement of the invention; and, FIG. 6 is another example of a tuned bushing.
Figure 6:
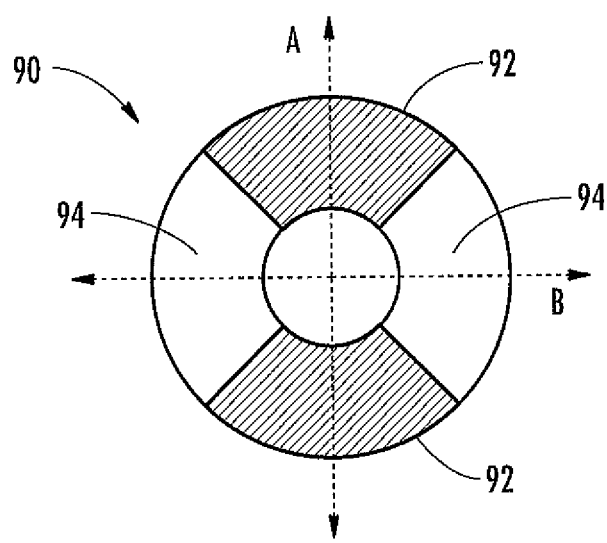

According to the invention, bushings are preferably formed as cylindrical members of resilient material sized and shaped to fit the bushing mounts 56, 66, and the material may be selected for rate or stiffness. Thus, the control arm 20 is attached to the axle with a selected amount of resilience. According to another aspect of the invention, the bushings in each of the bushing mounts 56, 66, may be individually selected, allowing, for example, the upper bushing assembly 50 to have the same or a different bushing rate than the lower bushing assembly 60, or allowing the two bushings in the each bushing assembly 50, 60 to have the same or different rates. Further, each bushing may have a variable rate to effect changes in the suspension characteristics, that is, a bushing may be made to have a different rate in one direction than in another. As shown in FIG. 5, one known variable rate bushing 80 employs voids 82 placed in the bushing in a selected portion or portions to soften that portion relative to the rest of the bushing. The voids 82 result in the bushing 80 being softer in a direction of the voids, in the figure along axis A. Alternatively, FIG. 6 shows a cross section of a bushing 90 formed of different materials, a relatively stiffer material 92 and a relatively softer material 94. The bushing 90 is relatively stiffer along the axis marked A than along the axis marked B. By selectively orienting a variable rate bushing 80, 90, in the bushing mount 56, 66, the directional rate of the bushing assembly may be tuned. Other arrangements are possible, for example, a bushing may be made with a stiffer material on one half and a softer material on the other half to provide different rates in opposite directions along the same axis.

Tuning the rate of the bushing assembly can affect the suspension characteristics. For example, making the two top bushings relatively stiffer in the fore/aft direction and relatively softer in the vertical direction and the bottom bushings relatively softer only in the fore aft direction and relatively stiffer in the vertical direction, which may be done with the variable bushings 80 or 90, can improve roll steer, lateral stiffness, roll rate, toe stiffness and camber stiffness.

The spacing and location of the upper bushing mounts 56 and lower bushing mounts 66 on the respective bushing assembly may be selected to orient the axle at a particular angle to set the pinion angle.

Turning again to FIG. 4, the lower bushing assembly 60 includes a beam 70 extending from the seat 62 in a direction that, when mounted, is opposite the control arm 20. The beam 70 includes mounting flanges 72 for a damper 74 (shown in FIGS. 1 and 2), which connects between the beam and the vehicle frame. At the end of the beam 70 is a spring seat 76 to support a spring member, illustrated in FIGS. 1 and 2 as an air spring 78. As may be seen in FIG. 1, the air spring 78 is mounted between the beam 70 and the vehicle frame.

By constraining the axle between the upper arm 32 and lower arm 34 of the control arm 20, any twist applied to the axle is applied about its axial center and an extra bending moment is not introduced during a roll event. By contrast, in conventional control arm suspensions, which connect to the axle on one side only (e.g., typically top or bottom), there is a bending introduced when the axle is twisted during a roll event.

The profile of the control arm 20 with its relatively deep vertical dimension (perpendicular to the axle axis) and relatively narrow lateral dimension (parallel to the axle axis) make it stiffer in the vertical direction than in the lateral direction. The vertical stiffness makes the control arm 20 effective in transferring load into the frame during a roll event. By being less stiff in the lateral direction, the control arm decreases the amount of preload going into the lateral torque rod. The lateral torque rod 80 may be attached between the torque rod bracket 18 seen in FIG. 1 and the frame rail 11.

The invention has been described in terms of preferred principles, embodiments, and components, however, those skilled in the art will understand that substitutions of equivalents may be made without departing from the scope of the invention as defined by the appended claims.

What is claimed is:

1. A suspension arrangement for interconnecting a vehicle frame and axle, comprising:
    a control arm comprising a beam having a first end with a single arm and a second end with an upper arm and a lower arm diverging to define a Y-shape, the first end being connectable to a vehicle frame, and the second end being connectable to a vehicle axle disposed between the upper and lower arms;
    a bushing arrangement mountable to the vehicle axle, the bushing arrangement including an upper bushing arrangement having an upper bushing formed from resilient material connecting to the upper arm and a lower bushing arrangement having a lower bushing formed from resilient material connecting to the lower arm, the upper bushing arrangement and lower bushing arrangement being interconnected by a member and providing a space therebetween for the vehicle axle, the upper bushing and lower bushing each having a selected stiffness.

2. The suspension arrangement of claim 1, wherein the control arm comprises a first beam and a second beam in parallel, spaced relation.

3. The suspension arrangement of claim 2, wherein the first beam and second beam each include a plate and flanges extending perpendicularly from edges of the plate, wherein the first beam and second beam are mutually disposed with the respective flanges extending in opposite directions.

4. The suspension arrangement of claim 2, wherein the first beam and second beam are connected with the bushing arrangement between the respective upper arms and lower arms.

5. The suspension arrangement of claim 1, wherein the upper bushing arrangement includes two upper bushings and the lower bushing arrangement includes two lower bushings.

6. The suspension arrangement of claim 5, wherein each of the two upper bushings and each of the two lower bushings has a selected stiffness.

7. The suspension arrangement of claim 1, wherein the bushing arrangement comprises a plurality of bushings, each bushing having a variable stiffness.

8. The suspension arrangement of claim 1, further comprising a hanger mountable to the frame, the first end being pivotally mounted to the hanger.

9. The suspension arrangement of claim 1, further comprising a spring mountable between a seat on a member mountable to and extending from the axle and the frame.

10. The suspension arrangement of claim 1, wherein the single arm, upper arm and lower arm of the beam define a plane, and wherein the beam is stiffer parallel to the plane than perpendicular to the plane.

11. A suspension arrangement for interconnecting a frame and an axle in a vehicle, comprising:
    a control arm comprising a first beam and a second beam in parallel, spaced relation, each beam having a first end with a single arm and a second end with an upper arm and a lower arm to define a Y-shape, the first end being pivotally connectable to a vehicle frame, and the second end being connectable to a vehicle axle disposed between the upper and lower arms; and,
    a bushing arrangement mountable to the vehicle axle, the bushing arrangement having an upper portion including an upper bushing formed from resilient material connecting between the upper arms of the first beam and second beam and a lower portion including a lower bushing formed from resilient material connecting between the lower arms of the first beam and second beam, the upper portion and lower portion being interconnected by a member and providing a space therebetween for the vehicle axle, the upper bushing and lower bushing of the bushing arrangement each having a selected stiffness.

12. The suspension arrangement of claim 11, wherein the first beam and second beam each include a plate section and flanges extending from edges of the plate section, wherein the first beam and second beam are mutually disposed with the respective flanges extending in opposite directions.

13. The suspension arrangement of claim 12, further comprising a hanger mountable to the frame, the first ends of the first beam and second beam being pivotally mounted to the hanger.

14. The suspension arrangement of claim 12, further comprising a spring mountable between the axle and the frame.

15. The suspension arrangement of claim 14, wherein the spring is disposed between a seat on an arm mountable to and extending from the axle and a bracket mountable to the frame.

16. The suspension arrangement of claim 11, wherein the bushing arrangement comprises a plurality of bushings, each bushing having a variable stiffness.

17. The suspension arrangement of claim 11, wherein the bushing arrangement includes two upper bushings and two lower bushings.

18. The suspension arrangement of claim 17, wherein each of the two upper bushings and two lower bushings has a selected stiffness.

* * * * *